Sept. 6, 1932.　　　H. C. LASSEN ET AL　　　1,876,250

ROTARY SPRAYER

Filed July 8, 1930

INVENTOR.
Harry. C. Lassen.
BY　Henry Dahl.
ATTORNEYS.

Patented Sept. 6, 1932

1,876,250

UNITED STATES PATENT OFFICE

HARRY C. LASSEN AND HENRY DAHL, OF SAN JOSE, CALIFORNIA, ASSIGNORS TO FOOD MACHINERY CORPORATION, OF SAN JOSE, CALIFORNIA, A CORPORATION OF DELAWARE

ROTARY SPRAYER

Application filed July 8, 1930. Serial No. 466,602.

This invention relates to spraying apparatus of the rotary type and has particular reference to an improved construction of such an apparatus which is adapted to be started and operated by liquid passing therethrough under high pressure and at low velocity, and under conditions which make automatic starting difficult.

Although apparatus embodying our invention is susceptible to a wide variety of applications and is in no sense limited to any particular use, we have found it to be especially useful in connection with the cultivation of flowers in greenhouses and the like. As fully explained in our copending application, Serial No. 466,786 filed July 9, 1930, it is desirable to prevent the temperature from rising too high in greenhouses, not only for protection against insects, but also because the heat causes unduly rapid evaporation of moisture from the plants with resultant injury to them. Attempts have been made to lower the temperature and supply the plants with the necessary moisture by means of sprinkling but it has been found that the temperature cannot be sufficiently lowered in this manner and the moisture is evaporated from the surfaces of the plants faster than they can absorb it from the earth. Moreover, the streams of water falling upon the plants result in considerable damage to the foliage and blossoms by tearing away petals and causing unsightly spots which render them unmarketable.

We have discovered that the greenhouse temperature can be controlled without damage to the plants by discharging relatively small amounts of water into the air in the form of a very fine fog or mist. When this is done throughout the entire greenhouse, the temperature can be materially lowered very quickly. Moreover, the mist envelopes the plants and deposits a thin film of moisture over the entire exposed surface of each plant, without forming any large drops. The plants are thus enabled to absorb moisture very rapidly without danger of disfiguring any of the foliage or blossoms.

It is also necessary to spray the plants from time to time with insecticide as a protection against destructive insects. This must also be applied in the form of a mist or fog since if any drops are allowed to collect upon the foliage or blossoms, unsightly spots result. Heretofore in order to apply the insecticide in this manner it has been necessary to provide a number of operators with hand spray pumps, and the operators begin at one end of the greenhouse and work toward the other end, keeping as near abreast of each other as possible in order to avoid the noxious vapors, and spraying the plants as they go. This method is laborious, expensive and excessively slow, but has been made necessary by the fact that automatic sprays capable of accomplishing the desired results have not been available.

In known types of rotary sprays, the liquid is supplied to the nozzles through bent pipes so that the passage of the liquid around the bends imparts an impulse to the arms which causes them to rotate. In order to overcome the inertia of the parts and the friction in the rotating hub, the velocity of the liquid passing the bends must be considerable, and usually amounts to from 10 to 25 gallons per minute at a pressure of approximately 45 pounds per square inch. Under these conditions the liquid cannot be converted into a mist or fog but issues from the nozzles in the form of solid jets or large drops. Any attempt to increase the pressure results in increasing the frictional resistance of the hub to such an extent that rotation is prevented and the spray is thus rendered useless.

Another difficulty is encountered in the operation of known types of rotary sprayers when they are used to spray liquids such as insecticides and the like which contain more or less sediment, or which leave a crystalline or gummy residuum when evaporated. During periods of idleness after being used with such a liquid, the liquid evaporates from the interior of the apparatus, leaving a deposit of sediment or crystals around the parts which causes them to stick or bind and thus prevents automatic starting of rotation when use is next attempted.

It is a principal object of this invention to construct a sprayer which shall be adapted to be rotated by the passage of liquid therethrough at low velocity and under high pressure.

Another object is to provide a rotary sprayer which shall be adapted to atomize liquid at a low rate and under high pressures.

A further object is to construct a rotary sprayer provided with means which shall insure self starting so that it shall be especially adapted for use with sedimentary liquids and under relatively high temperatures such as encountered in greenhouses and the like.

Other objects and advantages which have not been recited will become apparent as the description proceeds in connection with the accompanying drawing in which:—

Figure 1:
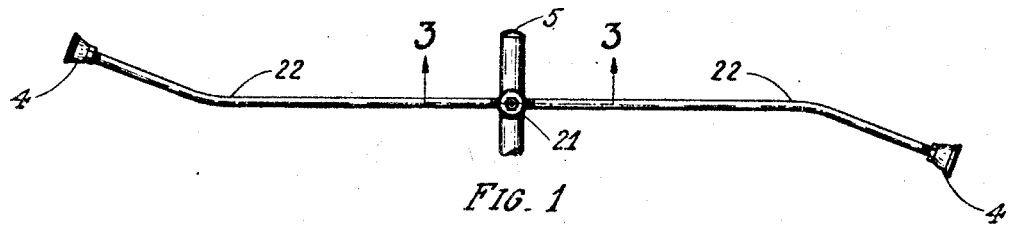
Fig. 1 is a plan view of a sprayer embodying our invention.
Figure 2:
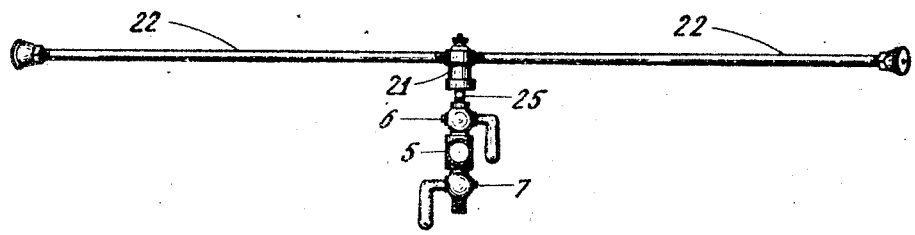
Fig. 2 is a side elevation of the sprayer illustrated in Fig. 1.
Figure 3:
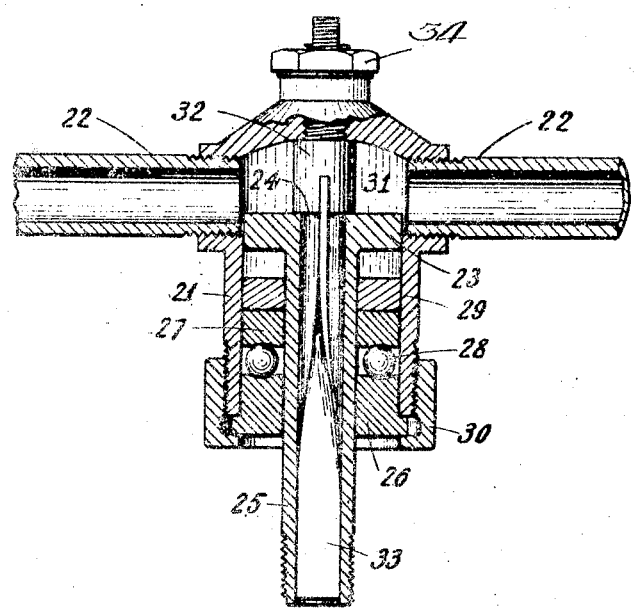
Fig. 3 is a sectional view taken along the line 3—3 of Fig. 1.

The sprayer illustrated comprises a hollow hub 21 from which protrude a plurality of outwardly extending pipes 22 carrying nozzles 4. The pipes may be bent as illustrated in order to aid rotation, as will be understood. The nozzles are supplied with liquid from a main supply pipe 5 which communicates with the interior of the hub 21 through the stem 25. A valve 6 may be provided for cutting off the supply of liquid to the nozzles when desired, and a valve controlled outlet 7 is provided for the ready attachment of a hose connection in cases where hand spraying is found desirable.

As above pointed out, considerable difficulty may be experienced in starting the hub to rotate after a period of idleness when the apparatus has been used to spray insecticides or similar sedimentary liquids due to sticking of the parts, and this is especially true when the sprayer is being used in a greenhouse as the heat encountered therein serves to evaporate the liquid from the interior of the hub very rapidly, leaving a deposit of sediment or crystals around the parts. In order to overcome this difficulty we have provided the hub 21 with a smooth bore for the reception of a plunger 23. The plunger is formed with a centrally depending stem 25 which passes through the plug 26, and is screwed into the supply pipe 5. A passage 24 extends through the stem and plunger.

A ring 27 is provided with an annular groove which cooperates with a similar groove in the plug 26 to form a raceway for ball bearings 28 which serve to reduce friction and allow the hub to rotate easily when filled with liquid under high pressure. A packing ring 29 is provided to prevent leakage and the parts are held in operative position by means of the retaining ring 30.

With this construction it will be seen that upon the admission of liquid under pressure to the chamber 31, the force exerted against the ceiling of the chamber will cause the hub 21 to rise with respect to the plunger 23, thus freeing the parts if they have become stuck, and allowing the hub to be started rotating easily. When the admission of liquid to the chamber 31 is cut off, the hub 21 again settles down until the plug 32 rests upon the plunger 23.

It will also be noted that by reason of the above construction the packing ring 29 is automatically adjustable according to the pressure of the liquid. As the liquid pressure is increased, the packing is compressed so as to expand slightly and make a tighter fit, while upon reduction of the pressure whereby a looser fit is sufficient, the pressure on the packing is proportionately reduced, thus allowing it to loosen slightly and offer less resistance to rotation of the hub 21.

We have found that in order to properly form and apply the mist, the liquid should be atomized under high pressure and at a relatively slow rate, and the sprayer disclosed herein is adapted to atomize as low as one-half gallon of liquid per minute under pressures as high as four hundred and fifty pounds per square inch. By reason of the smallness of the orifices in the nozzles 4, necessary to secure the proper rate and fineness of atomization of the liquid, the rate of flow through the pipes 22 is so low that the reaction caused by the bends in the pipes is insufficient to cause satisfactory rotation of the sprayer. In order to augment the turning force caused by the bends, and to aid starting, a twisted metal strip 33 carried by the plug 32 is placed within the hollow stem 25 whereby the passage is divided into two spirally ascending passages. It will be seen that the reaction set up by the passage of liquid therethrough will tend to cause the atomizer to rotate.

It has been found that speeds of rotation of known types of rotating sprinklers which are from fifty to sixty revolutions per minute are entirely too high for the atomizer shown herein for the reason that at such speeds the mist is not thrown far enough away from the nozzle to effect the desired result. We have found that a speed of approximately twelve revolutions per minute best for satisfactory operation of the atomizer and for discharging the mist to a proper distance. It will be understood that different speeds might be desirable under varying conditions of use and in such event the speed of rotation can be varied by adjusting the pitch of the spiral strip 33 or the angle of the bends in the pipes 22.

It will be noted that the plug 32 which carries the twisted strip 33 is provided with a threaded shank which may be screwed into a corresponding threaded hole in the top of the housing or hub 21. A lock nut 34 serves to lock the plug 32 in position. This construction permits the removal of the strip 33 for adjustment of its pitch and also provides means for regulating the length of stroke of the hub 21. The latter adjustment is sometimes desirable in order to compensate for wear on the packing 29 or other parts, since due to the high pressure used it is desirable to cut down as much as possible the shock resulting from the initial stroke of the hub 21 when the sprayer is started.

The operation will be apparent from the foregoing description. The valve 6 being open, the pipe 5 is supplied with liquid under pressure by any suitable means, whereupon the liquid is forced upwardly through the spiral passages in the stem 25 into the chamber 31, thus simultaneously exerting a lifting and twisting force to the hub 21 which causes it to rise and free itself if it has become stuck, whereupon it is caused to rotate, and atomized liquid is ejected from the nozzles 4 in all directions.

Having now described our invention and in what manner the same may be used, what we claim as new and desire to secure by Letters Patent is:—

1. In a spraying apparatus, a hollow rotatable hub, a plunger mounted therein, a nonrotatable stem supporting said hub, said stem being provided with a supply passage, and means attached to the roof of said hub and extending downwardly into said supply passage for causing rotation of said hub upon the passage of liquid therethrough, said hub being capable of reciprocation with respect to said plunger whereby, upon reciprocation, the extent to which said means for causing rotation projects into the supply passage is varied.

2. In a spraying apparatus, a hollow rotatable hub, a non-rotatable plunger mounted in peripheral contact with the inner wall of the hub, a stem supporting said plunger, said stem being provided with a supply passage communicating with the interior of said hub, and means attached to the roof of said hub and extending downwardly into the supply passage adapted to cause rotation of the hub upon the passage of liquid therethrough, said hub being capable of reciprocation with respect to said plunger.

3. In a spraying apparatus, a hollow distributor housing, a plunger mounted therein, a stem supporting said plunger, said stem being provided with a supply passage, a plug mounted in said housing to limit the plunger stroke, a closure member for that end of the housing through which the stem passes, a packing member disposed between the plunger and the closure member and spiral means attached to the plug and projecting into the supply passage for causing rotation of the housing upon the passage of liquid therethrough, said plug being adjustable to move the spiral means longitudinally of the housing.

4. In a spraying apparatus, a substantially cylindrical hollow hub, a plunger mounted in peripheral contact with the inner wall of the hub, a stem supporting the plunger and having a supply passage communicating with the interior of the hub, a spiral strip attached to the hub and extending into the supply passage, a closure member for one end of the hub, a packing gland disposed between the plunger and said closure member, and an anti-friction bearing disposed between said packing gland and closure member, said hub being capable of reciprocation and rotation with respect to said plunger.

Signed at San Jose this 30 day June 1930.

HARRY C. LASSEN.
HENRY DAHL.